Patented Jan. 29, 1952

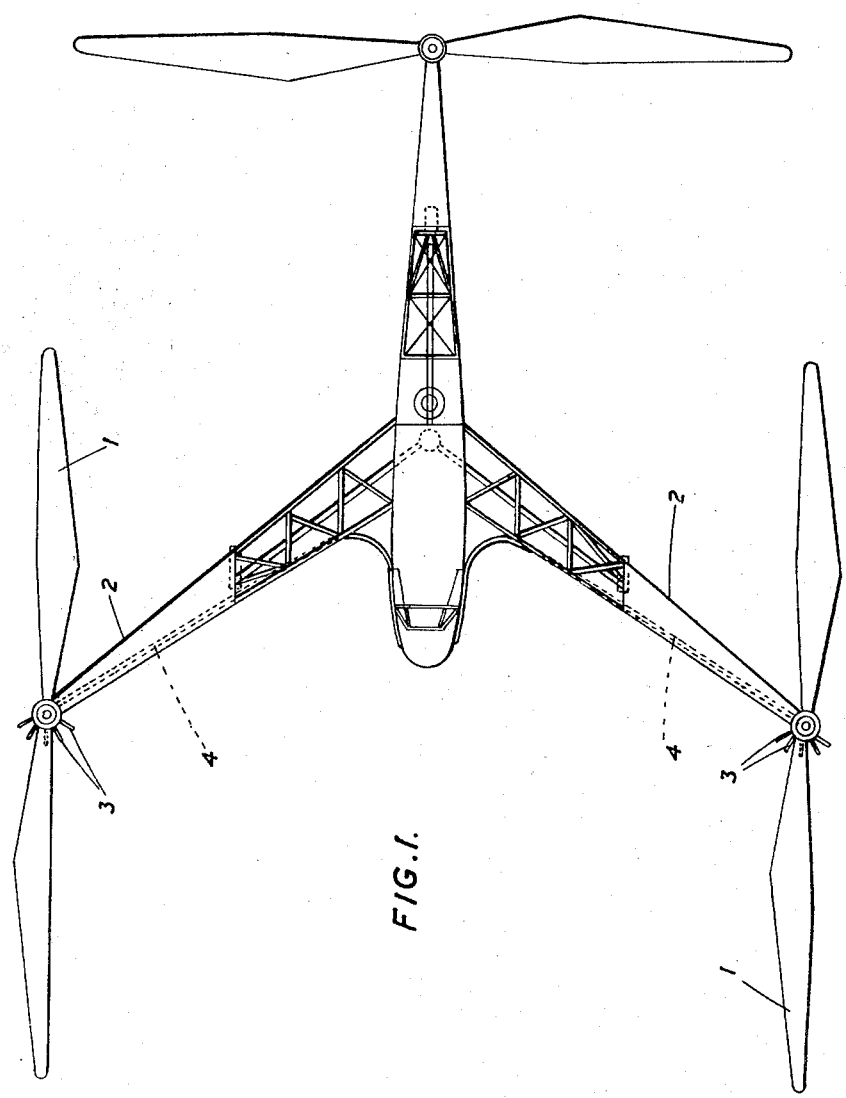

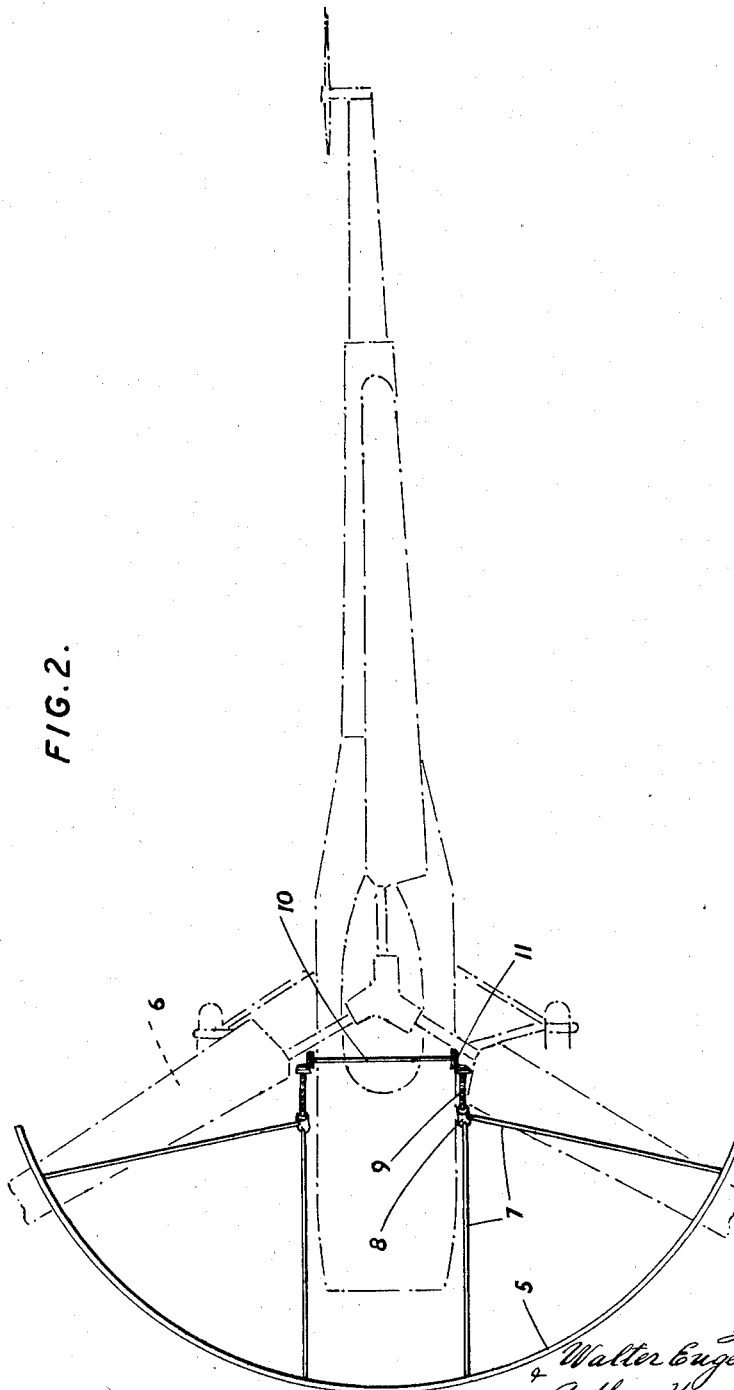

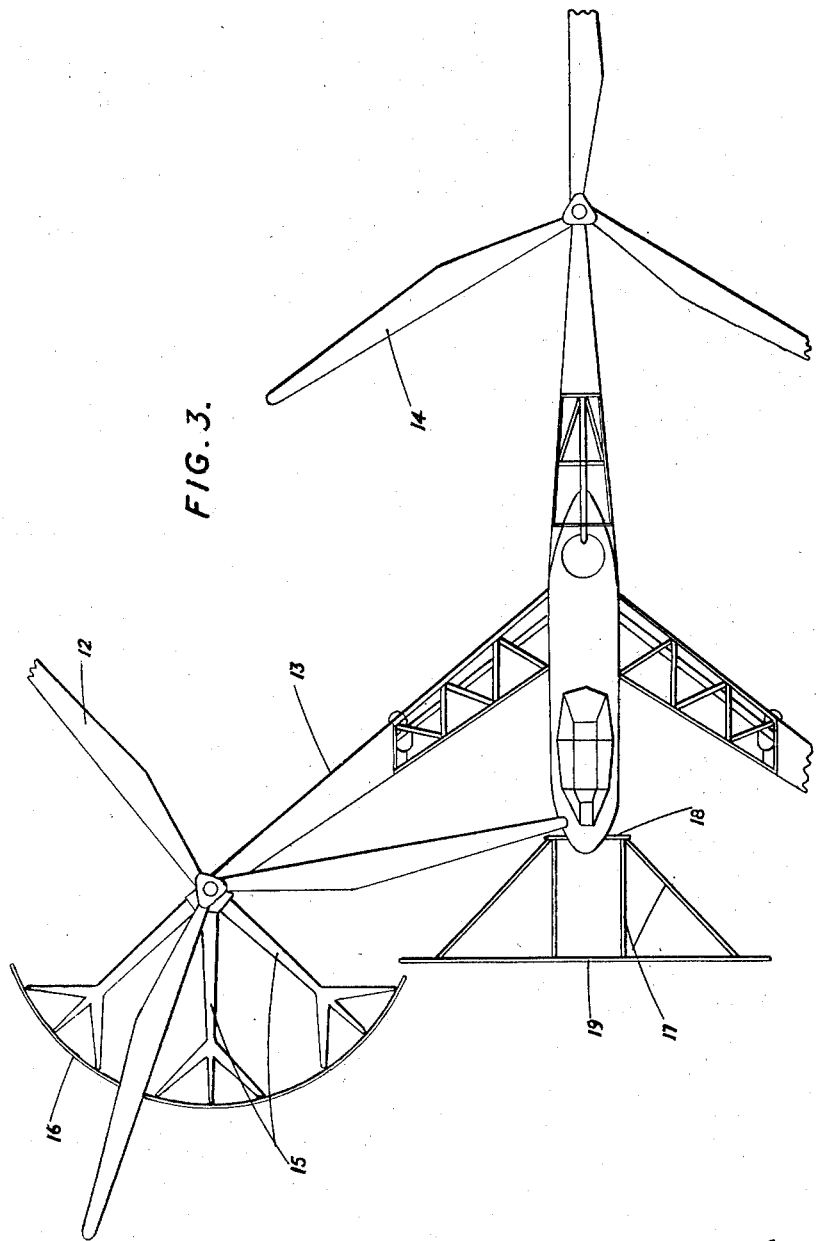

2,583,884

UNITED STATES PATENT OFFICE 2,583,884

MEANS FOR AERIAL SPRAYING

Walter Eugene Ripper, Harston, and Arthur Kennedy Dorman, Sawston, England, assignors to Pest Control Limited, Harston, England, a British company Application January 18, 1947, Serial No. 722,944
In Great Britain January 30, 1946

3 Claims. (Cl. 244—136)

This invention relates to an improvement in a method of and means for aerial spraying.

In the co-pending application of the said Walter Eugene Ripper for Letters Patent, Serial No. 722,945, filed January 18, 1947, which matured into Patent No. 2,583,883 on January 29, 1952, a method of treating a crop with a spray medium is described which comprises dispersing said spray medium and introducing said dispersed spray medium into the rotor downwash of a helicopter flying over said crop, so that said spray medium reaches said crop beneath said helicopter.

The said application also describes means for aerial spraying comprising a helicopter, a container for spray medium, means for dispersing said spray medium, a dosage regulator, and means for introducing said dispersed spray medium into the downwash of the helicopter rotor to ensure the prevention of a long swath, so that said spray medium reaches the crop beneath said helicopter.

In the said copending application it is pointed out that the downwash of the rotor of a helicopter resembles a funnel-shaped whirlwind in shape having a hollow cone full of eddies surrounded by a strong downward current originating from the rotor. When the helicopter hovers, this downwash hits the ground in a ring around the aircraft. This therefore produces what might properly be described as an annular downwash which confines the swath of distribution of the material that is sprayed.

It has now been found that improved results are obtained by introducing the liquid or dust into the forward part of the rotor downwash only.

It had previously been thought that the whole of the rotor downwash of a forwardly travelling helicopter would be deflected to the rear on striking the ground. From tests which have been made it now appears that, when the helicopter travels at a moderate velocity and low altitude, the forward part of the rotor downwash on striking the ground is actually deflected forwards and upwards, tending to produce a vortex. By introducing the liquid or dust into this forward part of the rotor downwash it has been found possible to effect an improved coverage of crops and more particularly of the under surfaces of the leaves or crops, and it is believed that this improved result is due to the above-mentioned phenomenon.

Accordingly the present invention provides means for aerial spraying comprising a helicopter, said helicopter having at least one rotor, a container for spray medium, means for dispersing said medium and means for introducing said dispersed medium into the forward part of the downwash of at least one rotor.

According to the present invention also there is provided a method of treating a crop with a spray medium which comprises dispersing said spray medium and introducing said dispersed spray medium into the forward part of the rotor downwash of a helicopter flying over said crop, so that said spray medium reaches the said crop beneath said helicopter and is deflected forwards and upwards on to the underside of said crop.

Preferably the apparatus also includes a dosage regulator.

The liquid or dust to be sprayed can be brought to the point of release in ducts, either dispersed in air or water or in a vaporous form, or it can be released from a position near to the centre of the rotor and have so much kinetic energy imparted to it that it is only broken up into a fine dispersion when it reaches the forward part of the rotor downwash as, for example from a number of forward projecting jets whereby the stream is broken up after a certain distance, this distance being so calculated that this occurs when it reaches the forward part of the rotor downwash.

One or more forwardly projecting spray booms carrying nozzles or spray bars may be used for ducting the material to be sprayed into the forward part of the rotor downwash. When a tri-rotor helicopter is employed, use may be made of the forward part of the downwash of each of the two forward rotors. The helicopter may fly forwards, or backwards or sideways and it will be understood that references herein to the forward part of the machine or apparatus refer to the forward part in the direction of travel. Thus if a tri-rotor helicopter is flown tail foremost, with the single rotor mounted in the tail leading, spray booms projecting forwardly in the direction of flight may be used for introducing material into the forward part of the downwash of each of the three rotors.

Preferably the spray booms are made adjustable for height in relation to the crop to be sprayed and the rotors.

In order that the invention may be well understood three embodiments thereof will now be described and illustrated with reference to the accompanying drawings, the three figures of which each show a plan view of one embodiment.

In these drawings, Fig. 1 is a top plan view of a tri-rotor helicopter provided with the spraying means arranged in accordance with the present invention;

Fig. 2 is a similar view, but of a one-rotor helicopter, part thereof being shown only in outline; and Fig. 3 is a top plan view, with duplicated parts omitted, of a tri-rotor helicopter, showing an alternative arrangement of the spraying means.

Referring now to Fig. 1, a tri-rotor helicopter is provided with two forward rotors 1 mounted on outriggers 2. Groups of forwardly projecting nozzles 3, arranged beneath the rotor hubs, are supplied through lines 4 with a dispersed liquid or dust from a pump or compressor, not shown, and deliver the liquid or dust with such velocity that it is only broken up into a fine dispersion when it reaches the forward part of the downwash of the rotors 1. This construction, as shown in Figure 1, provides a structure in which there are lifting rotors carried at the end of the outriggers rotating on vertical shafts passing through vertical rotor-hubs, and spray-discharge means below said rotors which are attached to and radiate outwardly from the said hubs to a locus which is forwardly of the nose portion of helicopter.

In the embodiment illustrated in Fig. 2 an arcuate spray bar 5 is disposed below the forward part of the single rotor 6 of a helicopter. The spray bar is carried by a spray boom comprising cantilever arms 7 rigidly secured to nuts 8 displaceable along screw-threaded spindles 9 when the latter are rotated by means of a cross shaft 10 driving the screw-threaded spindles through bevel gear 11. The liquid or dust is introduced into the forward part of the rotor downwash by means not shown, comprising a pump or compressor, a dosage regulator, flexible tubing leading to the spray bar and nozzles formed in the spray bar. The spray boom may be adjusted for height by rotation of the cross shaft 10.

In the embodiment illustrated in Fig. 3, a tri-rotor helicopter is provided with two forward rotors 12 mounted on outriggers 13 and a rear rotor 14 mounted in the tail. A spray boom comprising cantilever arms 15 carrying an arcuate spray bar 16 is slidably mounted on a vertical spindle mounted co-axially beneath each of the rotors 12. Each spray boom may be adjusted for height by sliding on the spindle.

A further spray boom comprising arms 17 secured to a rotatable cross shaft 18 and carrying a spray bar 19 is mounted in the nose of the helicopter and may be raised and lowered by rotation of the cross shaft 18. The spray bars are provided with nozzles, not shown, and supplied with liquid or dust for introduction into the forward part of the rotor downwash by means (not shown) as in Fig. 2.

We claim:

1. A helicopter adapted for the efficient spraying of insecticides and the like which comprises the combination of a fuselage having a frontal nose portion, outriggers connected to said fuselage and extending outwardly and forwardly thereof, lifting rotors carried at the end of said outriggers rotating on vertical shafts passing through vertical rotor-hubs, and spray-discharge means below said rotors attached to and radiating outwardly from said hubs to a locus forwardly of said nose portion.

2. A helicopter as claimed in claim 1 in which the spray-discharge means radiating from said hubs are in the form of cantilever arms supporting arcuate spray-bars.

3. A helicopter as claimed in claim 1 having additional spray-discharge means attached to and extending forwardly of the nose portion of the fuselage of the helicopter.

WALTER EUGENE RIPPER.
ARTHUR KENNEDY DORMAN.

REFERENCES CITED

The following references are of record in the file of this patent:

UNITED STATES PATENTS

| Number | Name | Date |
|---|---|---|
| 1,732,406 | Junkers | Oct. 22, 1929 |
| 1,971,734 | Stalker | Aug. 28, 1934 |
| 1,997,669 | Arcieri | Apr. 16, 1935 |
| 2,098,887 | Satterlee | Nov. 9, 1937 |
| 2,318,259 | Sikorsky | May 4, 1943 |

FOREIGN PATENTS

| Number | Country | Date |
|---|---|---|
| 153,063 | Great Britain | Oct. 25, 1920 |

OTHER REFERENCES

Article in "American Helicopter," Aug. 1946, vol. 3, November 9, pages 28 and 41; published by American Helicopter Magazine, 32 East 57th St., New York 22, N. Y.